Oct. 3, 1967   ERWIN-WALTER SIBER   3,345,113
ENDLESS TRACKS, BELTS OR THE LIKE
Filed Oct. 15, 1965   3 Sheets-Sheet 1

Inventor
Erwin-Walter Siber
By
Cushman, Darby + Cushman
Attorneys

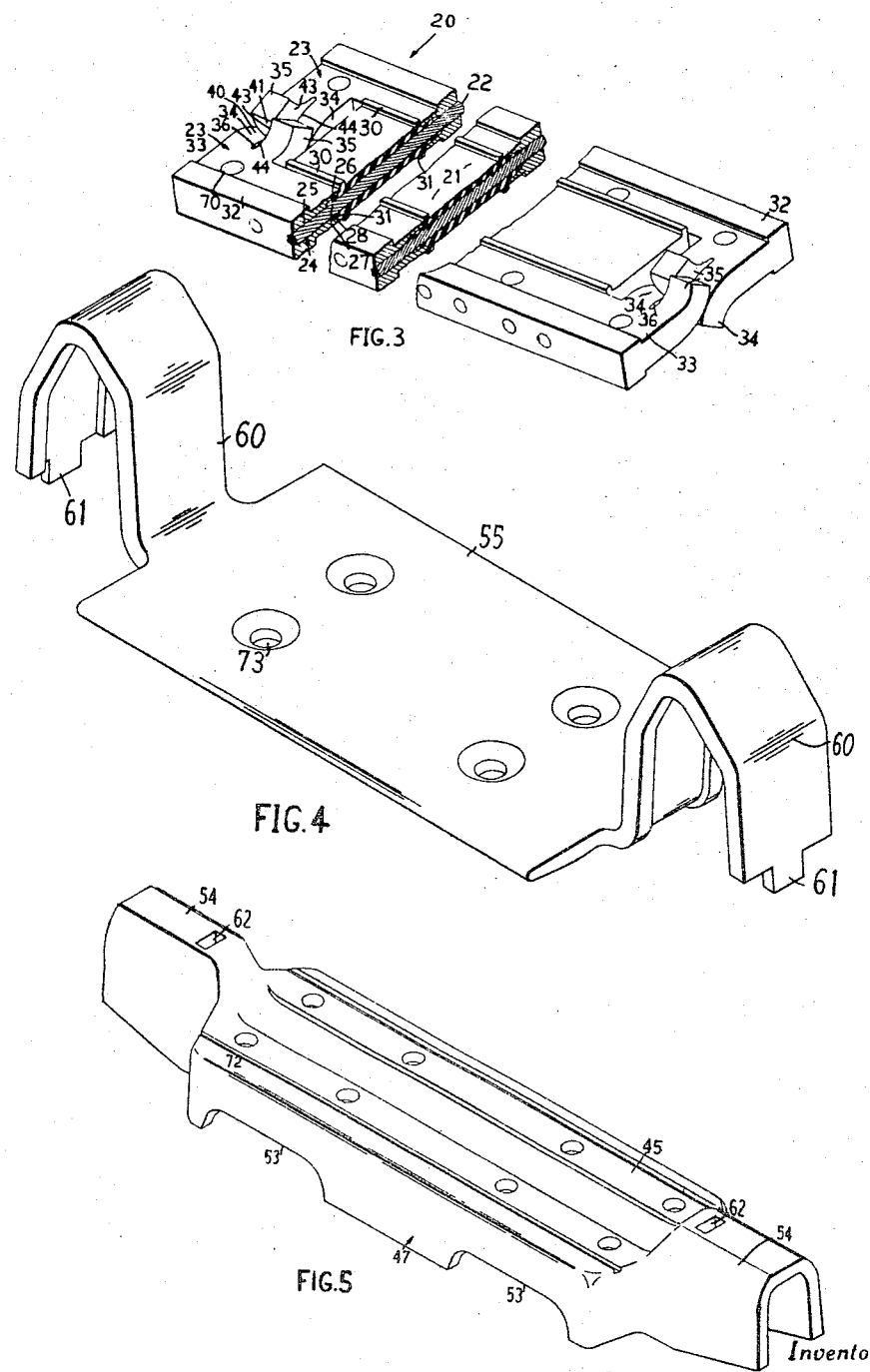

United States Patent Office 3,345,113
Patented Oct. 3, 1967

3,345,113
ENDLESS TRACKS, BELTS OR THE LIKE
Erwin-Walter Siber, Longueuil, Quebec, Canada, assignor to Go-Tract Limited, Dorval, Quebec, Canada, a Canadian company
Filed Oct. 15, 1965, Ser. No. 496,572
Claims priority, application Canada, Nov. 10, 1964, 916,119; Great Britain, Aug. 31, 1965, 37,213/65
10 Claims. (Cl. 305—14)

ABSTRACT OF THE DISCLOSURE

An endless tract for use on track-laying vehicles, the endless track comprising at least a sheet of resilient material through which a plurality of stranded cables extend, the cables being capable of relative sliding movement with respect to the resilient material. A lubricant is provided for the strands of the cables, the lubricant being located within but separated from the sheet of resilient material.

---

This invention concerns improvements relating to endless tracks, belts or the like.

According to the present invention, there is provided an endless track, belt or the like or an element thereof, comprising a sheet of resilient material through which extend a plurality of stranded cables, and a lubricant which is maintained in contact with the individual strands of each cable so that, when the said resilient sheet is flexed, movement of the strands of each cable over each other is assisted and abrasion thereof is reduced.

The invention is, for example, applicable to endless tracks for track-laying vehicles, endless conveyor belts for the transport of heavy articles, and mobile side walks.

Preferably each cable has been formed from a plurality of wires each of which has been lubricated and then drawn through a die, the wires being thereafter stranded together. Lubricant may, moreover, be introduced into the cable during the stranding of the said wires.

The said lubricant may comprise a mineral oil, molybdenum, disulphide, or graphite.

Each cable may, moreover, be coated externally with a layer of a lubricating grease.

Each cable is preferably such that, when the cable is tensioned, the loads carried by the said individual strands are directly related to their strengths.

Thus at least the majority of the said strands are preferably of the same strength and of substantially the same length. Each cable may, for example, have a plurality of inner strands and a plurality of outer strands, the pitch of the inner strands being less than that of the outer strands.

Successive strands of each cable may be wound in opposite directions.

Each cable, throughout at least part of its length, may be disposed within a tube of a thermoplastic synthetic resin which is sealed against the cable so as to retain the said lubricant. The said tubes may be embedded in the resilient sheet by virtue of the latter having been moulded onto the tubes.

Means are preferably provided for anchoring opposite ends of each cable. The said opposite ends may, for example, extend outwardly of the resilient sheet. Means may, moreover, be provided for preventing bending of the cables adjacent the said anchoring means.

Means are preferably provided for limiting fflexing of the resilient sheet.

Figure 1:
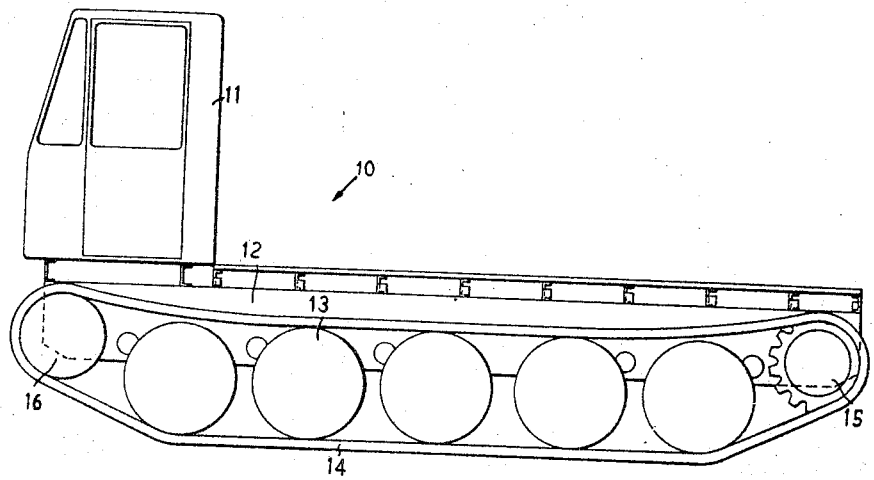
Figure 2:
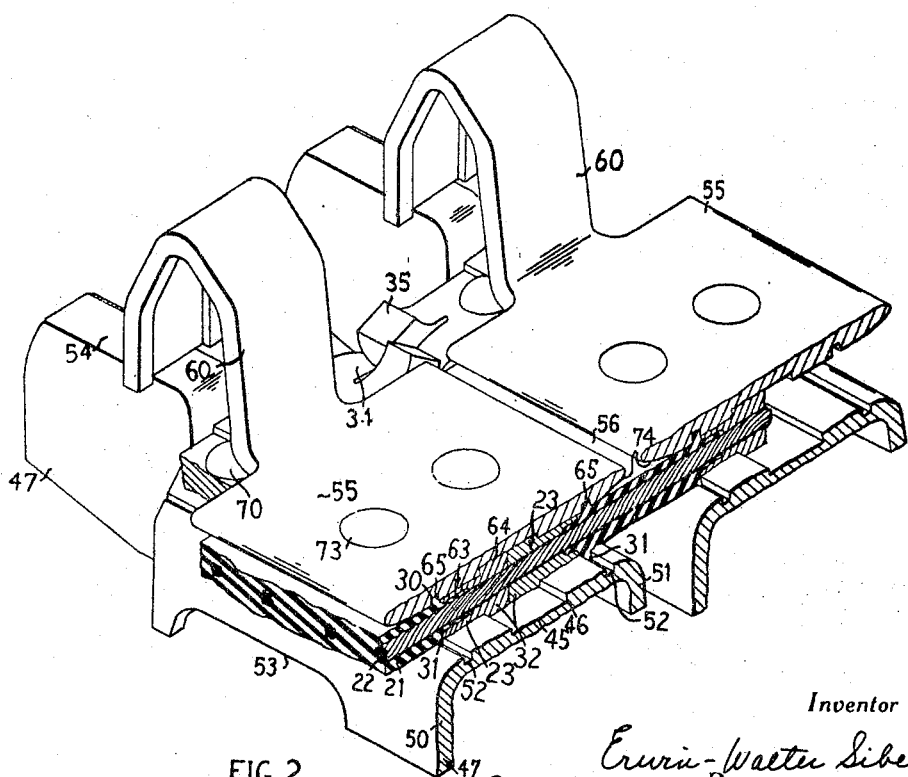
Figure 6:
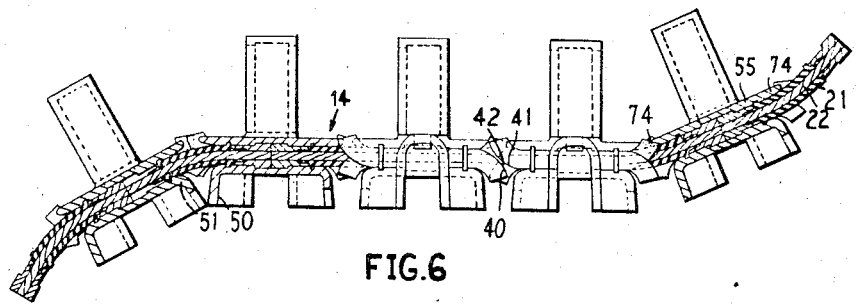

The invention is illustrated, merely by way of example, in the accompanying drawings, in which:

FIGURE 1 is a diagrammatic side elevation of a track-laying vehicle provided with an endless track embodying the present invention, FIGURE 2 is a broken away perspective view, partly in section of a part of the said track, FIGURE 3 is an exploded perspective view, partly in section, of a part of the structure shown in FIGURE 2, FIGURE 4 is a perspective view of another part of the structure shown in FIGURE 2, FIGURE 5 is a perspective view of yet another part of the structure shown in FIGURE 2, and FIGURE 6 is a cross-section through a part of the said track illustrating the positions of the components thereof during bending.

In FIGURE 1 there is shown a track-laying vehicle 10, e.g. a transporter, having a driver's cabin 11 and a body portion 12. The body portion 12 is carried by two sets of wheels 13 (only one set of which are shown) which are disposed on opposite longitudinal sides of the vehicle 10.

Each set of wheels 13 is mounted in an endless track 14 which is entrained over two transversely spaced driven sprockets 15 (only one shown) and an idler wheel or wheels 16.

Each track 14 comprises a series of elements or links 20 (see FIGURE 3). Each link 20 comprises a sheet 21 of rubber or other resilient material through and outwardly of which extend a plurality of transversely spaced apart, helically stranded, longitudinally extending cables 22.

To limit the tendency of the stranded cables 22 to unwind when in tension, successive strands of each cable 22 may be wound in opposite directions.

Each link 20 is provided with two substantially U-shaped parts 23, each part 23 having longitudinally extending bores 24 therein in which the cables 22 are disposed.

By applying compressive loads to the parts 23, the outer ends 25 of the bores 24 have been crimped into gripping contact with the respective ends of the cables 22 so as to form anchorages therefor.

The inner portion 26 of each bore 24 is spaced from the respective cable 22 by an annular space 27 which is filled with a cylindrical portion 28 of the resilient sheet 21, and these portions 28 may, if desired, be split axially.

The individual strands of each cable 22 are lubricated with a lubricant (not shown) which is maintained in contact therewith so that, when the resilient sheet 21 is flexed, movement of the strands of each cable 22 over each other is assisted and abrasion thereof is reduced.

The lubricant may be a heavy oil, e.g. a heavy mineral oil, a solid lubricant such, for example, as molybdenum disulphide or graphite, or a liquid (e.g. wood spirit) containing particles of such a solid lubricant.

Each of the cables 22 may be formed of metal or alloy wires which have been lubricated, e.g. with a mineral oil, prior to being drawn through a die. Such lubrication will not only assist the drawing operation but will also provide the wires with a film or layer of lubricant. These wires may then be stranded togeher with further such lubricant introduced into the cable during the stranding operation. As much lubricant as possible should desirably be stranded into each cable 22, and the cable 22 then coated externally with a layer of a lubricating grease e.g. a grease containing molybdenum disulphide.

The lubricant will tend to adhere to the surface of each of the strands of the cable so as to provide lubricant films or layers of single molecule thickness which will slip readily over each other and which will withstand high compressive loads. The consequential reduction in the abrasion of the strands of the cable will substantially increase their life.

The lubricant may, moreover, be replenished by means of a hypodermic syringe introduced through the resilient sheet 21. If desired, an annular gap (not shown) may be provided between each cable 22 and its resilient sheet 21, the said annular gap containing a quantity of lubricant.

The portions 28 of the resilient sheet 21 act as seals to prevent escape of the lubricant.

If desired, instead of providing the construction shown in the drawings, each of the cables 22 may be disposed within a tube (not shown) of a thermoplastic synthetic resin, the opposite ends of the cables 22 extending outwardly of the said tubes. The tubes may be shrunk onto the cables so as to retain the lubricant, and may be embedded in the resilient sheet 21 by moulding the latter onto the tubes.

The cables 22 may be formed of a plurality of identical metal wires of the same thickness, length and strength and may consist of a plurality of inner wires which are stranded together and a plurality of outer wires which are stranded together, the pitch of the inner strands being less than that of the outer strands. Accordingly, when the cable is tensioned, the various wires will all carry substantially the same load and there will not therefore be a tendency for certain wires to break before others.

If desired, the said inner wires may be constituted by six metal wires helically stranded about a hemp central strand, and the said outer wires may be constituted by twelve metal wires helically stranded about the said six inner wires.

The upper surface of the resilient sheet 21 is provided at its opposite edges with flanges 30 whose side faces respectively abut the two parts 23. The lower surface of the resilient sheet 21 is also provided at its opposite edges with flanges 31 which are aligned with the flanges 30 and whose side faces also abut the parts 23.

The provision of the flanges 30, 31 ensure that if the link 20 is bent about its transverse axis toward or away from the centre of the track 14, the cables 22 will not be bent adjacent to the end thereof at which they are anchored.

Each of the parts 23 is provided with an end flange 32 and has side limbs 33. Each of the limbs 33 is provided with a downwardly curved tongue 34 and with an upwardly curved tongue 35 which is spaced from its respective downwardly curved tongue 34 by a small gap 36.

The downwardly and upwardly curved tongues 34, 35 are respectively provided with curved surfaces 40, 41. The curved surfaces 40, 41 of one of the parts 23 are adapted to abut and roll over the curved surfaces 41, 40 respectively of the other part 23. Such abutment occurs however only when the link 20 is loaded in other than longitudinal tensile loads, the respective surfaces 40, 41 of the two parts being spaced from each other when subjected to longitudinal tensile loads by a gap 42 (see FIGURE 6).

The upwardly curved tongues 35 of the two parts 23 will bring the surfaces 43 into contact with each other and over one another. Similarly, the downwardly curved tongues 34 have side surfaces 44 which are adapted to abut and slide over one another.

By reason of the provision of the gap 36, the side surfaces 43 of the two parts 23 are normally slightly spaced apart, while the side surfaces 44 of the two parts 23 are also normally spaced apart. Only restricted transverse relative movement can, however, occur between the two parts 23 since any substantial transverse relative movement will bring the surface 43 into contact with each other and will also bring the surfaces 44 into contact with each other. The restriction of any substantial transverse relative movement assists in preventing derailment of the wheels 13.

The curved tongues 34, 35 act as cams which permit the link 20 to be bent about its transverse axis in directions towards and away from the centre of the track 14 but which restrict certain predetermined relative movement of adjacent portions of the two parts 23. Thus, as already described above, the curved tongues 34, 35 restrict transverse relative movement of adjacent portions of the parts 23. The curved tongues, 34, 35 also restrict relative vertical movement of adjacent portions of the parts 23, since any such relative vertical movement will bring certain of the curved tongues 34, 35 of one of the parts 23 into abutment with the respective curved tongues of the other parts. The curved tongues 34, 35 will, moreover, restrict relative movement of the parts 23 towards one another since any such movement will again be resisted by abutment between respective curved tongues of the two parts 23. Furthermore, the curved tongues 34, 35 will prevent twisting and fanning movement of the two parts 23 about the longitudinal axis of the link 20 since again any such twisting and fanning movement will be resisted by the curved tongues 34, 35.

Since the curved tongues 34, 35 restrict relative vertical movement, relative sideways stepping, and relative twisting and fanning of adjacent portions of the parts 23, these parts are prevented from adopting a configuration which would result in severe loading of the cables 22 close to their anchorage points with resulting severe stresses.

The end flanges 32 of abutting parts 23 of adjacent links 20 are located and secured in a groove 45 in the upper surface 46 of an inverted U-shaped ground engaging grouser 47, the side walls of the groove 45 preventing longitudinal separation of the said adjacent links.

Each grouser 47, which has limbs 50, 51, is provided with two spaced square-section grooves 52 in which are located the flanges 31 of the resilient sheets 21 of the two adjacent links 20.

As best seen in FIGURE 5, each grouser 47 has two transversely spaced cut-away portions 53 to improve ground adhesion and is provided at its end with gear tooth portions 54 which are respectively adapted to mesh with the sprockets 15.

As clearly shown at the left hand side of FIGURE 6, if a part of the track 14 becomes reversely bent, i.e. is bent in a direction away from the centre of the track 14, such reverse bending is limited by the engagement which will ultimately occur between the limb 50 of one grouser 47 and the limb 51 of the adjacent grouser 47. Such reverse bending can, for example, occur when the vehicle passes over logs or other obstacles.

Each track 14 is provided with a series of cover plates 55 which are normally spaced from each other axially by gaps 56 and which extend to close to the centres of the links 20. The cover plates 55 are adapted for the passage thereover of the wheels 13.

In order to guide the wheels 13, and to locate the grousers 47 with respect to the sprockets 15, each cover plate 55 is provided at each of its opposite transverse edges with an inverted U-section guide portion 60. The outer end of each guide portion 60 is provided with a lug 61 (FIGURE 4) which fits into a hole 62 (FIGURE 5) in the gear tooth portion 54 of the respective grouser 47.

Each cover plate 55 has an under surface 63 which is formed with a recess 64 in which are located and secured the upper portions of the end flanges 32 of abutting parts 23. The side walls of the recess 64 prevent longitudinal separation of adjacent links 20. The under surface 63 is also provided with two axially spaced rectangular section grooves 65 in which are located the flanges 30 of the resilient sheets 21 of the two respective links 20.

The cover plates 55, parts 23, resilient sheets 21, and grousers 47 are also connected together with rivets or bolts 70. All the rivets or bolts 70 pass through holes 71 in the parts 23 and holes 72 in the grouser 47, while some of the rivets or bolts 70 also pass through countersunk holes 73 in the cover plates 55.

By reason, however, of the fact that the parts 23 are longitudinally secured together by the grousers 47 and cover plates 55 independently of the use of the rivets or bolts 70, such rivets or bolts are maintained substantially free from subjection to shear stresses.

The cover plates 55 are provided at their longitudinally opposite ends with radiused portions 74 which extend outwardly of the region in which the cables 22 are anchored. As shown on the right hand side of FIGURE 6, when the track 14 becomes normally bent, i.e. with the kind of curvature which would be caused by its passing around the sprockets 15, the radiused portions 74 ensure that the track has a continuous radius which although not identical to the pitch circle radius of the sprockets 15 is the true radius of the non-anchored portion of the cable 22 minus half the thickness of the resilient sheet 21. This ensures that each cable 22 bends over a predetermined radius, that it is supported by the respective cover plates 55, that a cushion is provided throughout this bending by the contact between the radiused portions 74 with the resilient sheet 21, and that stresses at the anchored ends of the cable are minimised. Without this feature the cables 22 would bend close to their anchorage points and would straighten out therebetween, and this would result in sharp bends and highly localised stresses.

When branches, roots, or other debris are taken around by the track 14 and through the sprockets 15 a condition of over-bending will occur in the track 14 and towards the centre thereof. Under this condition two adjacent cover plates 55 will contact each other and thus limit the amount of bending of the cables 22, the latter still, however, following the predetermined radius described above. Moreover, the over-bending which will then occur, will take place at the centre of the cables where they are most flexible.

The cover plates 55 are such that the wheels 13 pass thereover without touching the resilient sheets 21. Moreover any foreign matter which is trapped between the wheels 13 and the track 14 and whose particle size is sufficient to cause damage to the resilient sheets 21 cannot pass through the narrow gaps 56 between adjacent cover plates 55. Moreover, the upper or return run of the track 14 adopts a catenary shape which encourages such foreign matter to drop out of the track.

The curved tongues 34, 35 are such that when either the cover plates 55 or grousers 47 move towards each other, the curved tongues 34, 35 guide them towards abutment with each other so as to limit the permissible amount of bending movement.

I claim:

1. An endless track element comprising a sheet of resilient material, a plurality of stranded cables within and extending through said sheet and capable of relative sliding movement with respect thereto, a quantity of lubricant surrounding said cables and providing a lubricating film between said cables and the material of said sheet, said lubricating film also being between the strands of said cables, and means for maintaining the lubricant in contact with the individual strands of each cable, movement of the cables in said sheet and of the strands of each cable over each other during flexing of the said sheet being assisted and abrasion thereof being reduced by the said lubricant.

2. An endless track element as claimed in claim 1 in which each cable comprises a plurality of wires which are stranded together, each said wire having been lubricated and drawn through a die.

3. An endless track element as claimed in claim 2 in which lubricant is introduced into the cable during the stranding of the said wires.

4. An endless track element as claimed in claim 1 in which the said lubricant comprises a mineral oil, molybdenum disulphide or graphite.

5. An endless track element as claimed in claim 1 in which each cable is coated externally with a layer of a lubricating grease.

6. An endless track element as claimed in claim 1 in which, when the cable is tensioned, the loads carried by the individual strands of each cable are directly related to the strengths of the strands.

7. An endless track element as claimed in claim 6 in which at least the majority of the said strands are of the same strength and of substantially the same length.

8. An endless track element as claimed in claim 7 in which each cable has a plurality of inner strands and a plurality of outer strands, the pitch of the inner strands being less than that of the outer strands.

9. An endless track element comprising a sheet of resilient material, a plurality of stranded cables which are disposed for relative sliding movement within the said sheet and which have opposite ends disposed outwardly of the said sheet, anchoring means for anchoring the said opposite ends of each cable, means for preventing bending of the cables adjacent the said anchoring means, a quantity of lubricant surrounding said cables and providing a lubricating film between said cables and the material of said sheet, said lubricating film also being between the strands of said cables, and means for maintaining the lubricant in contact with the individual strands of each cable, movement of the cables in the said sheet and of the strands of each cable over each other during flexing of the said sheet being assisted and abrasion thereof being reduced by the said lubricant.

10. An endless track element as claimed in claim 9 comprising means for limiting flexing of the resilient sheet.

References Cited

UNITED STATES PATENTS

| | | | |
|---|---|---|---|
| 2,025,999 | 12/1935 | Myers | 305—37 |
| 2,430,500 | 11/1947 | Freedlander | 74—237 X |
| 2,444,583 | 7/1948 | Stewart | 74—237 |
| 2,487,813 | 11/1949 | Knox | 305—38 |
| 2,516,115 | 7/1950 | Hagenbuch | 305—14 |
| 2,815,988 | 12/1957 | Dowell | 305—37 |
| 3,016,756 | 1/1962 | Jackel | 74—237 X |
| 3,063,758 | 11/1962 | Fikse | 305—43 X |

BENJAMIN HERSH, *Primary Examiner.*

RICHARD J. JOHNSON, *Assistant Examiner.*